United States Patent [19]
Mehr

[11] 3,863,098
[45] Jan. 28, 1975

[54] TWO-AXIS POSITIONING CONTROL
[75] Inventor: Morton H. Mehr, Norwalk, Conn.
[73] Assignee: Measurement Systems, Inc., Norwalk, Conn.
[22] Filed: Feb. 23, 1973
[21] Appl. No.: 335,005

Related U.S. Application Data
[63] Continuation of Ser. No. 69,569, Sept. 4, 1970, abandoned.

[52] U.S. Cl............315/367, 315/27 TD, 340/324 A, 315/377
[51] Int. Cl............................ H01j 29/70
[58] Field of Search....... 315/26, 27 TD; 343/5 EM; 340/324 A

[56] References Cited
UNITED STATES PATENTS

| | | |
|---|---|---|
| 2,778,972 | 1/1957 | Ellis .................................. 315/26 X |
| 2,840,311 | 6/1958 | Magnuson et al. ............. 340/324 A |
| 2,872,669 | 2/1959 | Johnson et al................... 340/324 A |
| 2,942,147 | 6/1950 | Taubenslag et al............ 340/324 A |
| 3,161,872 | 12/1964 | McClure........................... 315/26 X |
| 3,171,120 | 2/1950 | Beeler et al...................... 343/5 EM |
| 3,346,853 | 10/1967 | Kester et al..................... 340/172.5 |
| 3,541,521 | 11/1970 | Koster.............................. 343/5 EM |

Primary Examiner—Stephen J. Lechert, Jr.
Attorney, Agent, or Firm—Smythe & Moore

[57] ABSTRACT

A force operated manual control for positioning a cursor on a display tube such as a cathode ray tube.

4 Claims, 5 Drawing Figures

TWO-AXIS POSITIONING CONTROL

This is a continuation of application Ser. No. 69,569, filed Sept. 4, 1970, now abandoned.

This invention relates to display tubes and means for positioning a cursor or reference display thereon.

Force or isometric control means are known in the art as are computer generated displays for cathode ray tubes. Such displays are used, for example, in aircraft tracking displays in aviation control towers. Previous devices for positioning cursors have been complicated in operation and have tended to distract the operator from his main task of tracking. Track ball controls have been used.

One of the objects is to provide a simplified cursor display system.

Another of the objects of the invention is to provide a cursor display system that requires only a small part of the attention of the operator.

In one aspect of the invention, an isometric type force control means is provided for manual movement by the operator in X-Y directions, such being an analog signal generator. The analog signal is fed into a pulse generator where the pulses produced have a rate which is the magnitude and polarity of the analog signal. The pulses are fed into an up-down counter circuit which generates a position locating signal on a display tube or the like.

Other objects, advantages and features of the present invention will become apparent from the accompanying description and drawings, which are merely exemplary.

Figure 1:
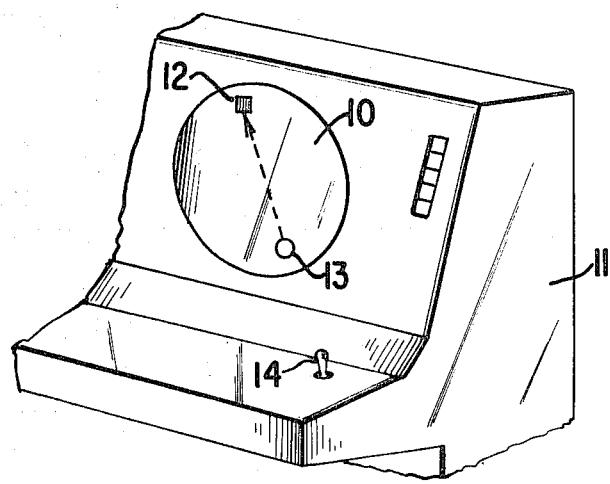
FIG. 1 is a schematic perspective view of a display console.

In the form shown in FIG. 1, an operator (not shown) can be in front of the cathode ray tube display screen 10 located in console 11. A number of blips can be located on the screen depicting various airplanes, the blips being formed by known radar techniques, one blip 12 being shown. Cursor display symbol or indicator 13 appears on the screen when activated. In order to indicate or designate one of the aircraft, the operator wishes to move the symbol so as to encircle the blip 12.

In the present invention, a "joy stick" or isometric control handle 14 is employed. One example of such a control is shown in U.S. Pat. No. 3,270,260. A force exerted by the operator on the relatively small control stick 14 (FIGS. 1, 2) will produce a pair of d.c. signals, e.g. ± 1.5 volts d.c. One is proportional to the X component of force on the control handle and the other is proportional to the Y component of force. As is known, the control handle will return to its central position when released so that the signal returns essentially to zero.

Figure 3:
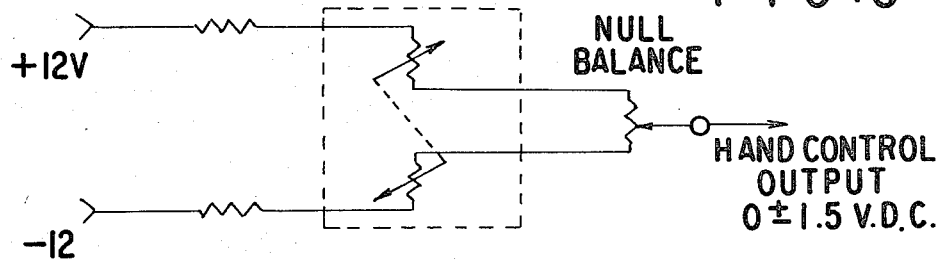
FIG. 3 is a schematic circuit diagram of the isometric control means.

One example of a hand control circuit is schematically shown in FIG. 3, wherein one axis is illustrated. The control, of course, may take various forms.

Figure 2:
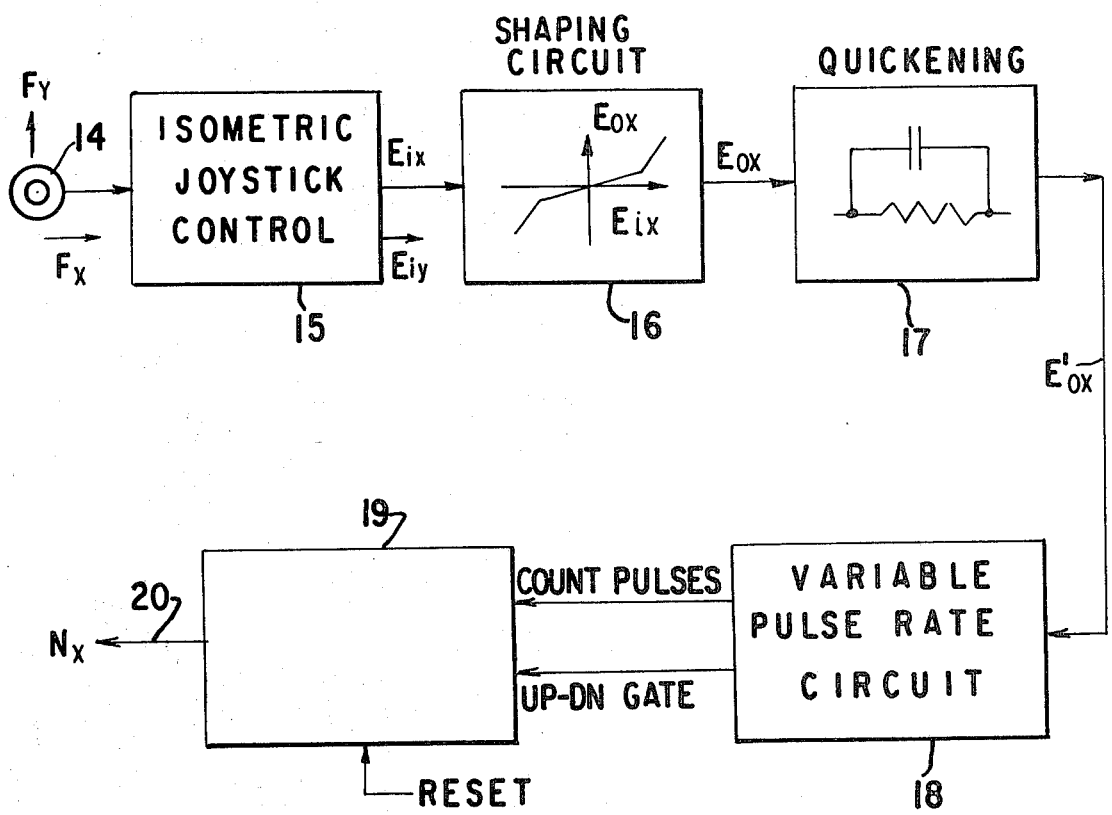
FIG. 2 is a block diagram of a circuit which can be employed.

If a force is applied to handle 14, a pair of resolved voltages will be fed to the analog shaping circuit 16 through control circuit 15 as illustrated in FIG. 2. Such is fed through the quickening circuit 17 to variable pulse rate circuit 18 which provides count pulses to a conventional up-down counter 19. The up-down counter shown provides a binary signal but also could be one which provides a binary coded decimal signal. The up-down counter will provide a digital cursor positioning signal 20 as will be explained hereafter.

Figure 4:
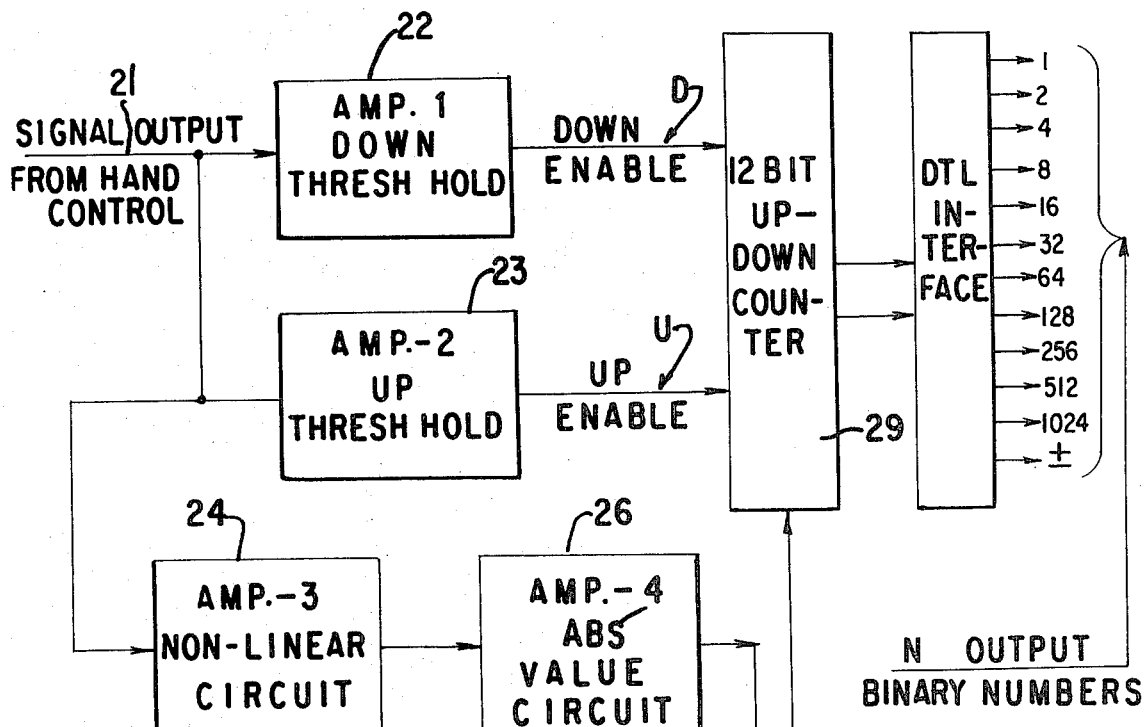
FIG. 4 is a schematic block diagram of the up-down computer.

The signal output from each axis of the hand control shown schematically in FIG. 3 is fed, as shown in more detail in FIG. 4, to lead 21 which in turn is connected to threshold operational amplifier means 22, 23. These may be integrated circuit amplifiers as also is true of the other operational amplifiers and elements. The operational amplifiers can provide a small amount of a dead band so as to prevent the up-down counter from counting when no force is exerted on the control handle 14. The threshold amplifiers also can provide gating levels for the counter to activate it to count up or count down.

Operational amplifier 24 is non-linear amplifier having a high signal gain, for example, approximately six times the low signal gain. The non-linear amplifier 24 uses a 2 slope diode network operating on the forward resistance characteristics of its diodes.

Output 25 of non-linear amplifier 24 is fed to an absolute value operational amplifier 26 which functions as a full wave rectifier having an output which is proportional to the absolute value of its input.

Operational amplifier 27 receives the signal from amplifier 26, which with amplifier 27 and a uni-junction transistor forms a pulse-rate generator. The number of pulses per second, or unit of time, will be proportional to the voltage input. As an example, the pulse rate can be varied from a few pulses per second to approximately 2,000 pulses per second.

The pulses from generator 27 are fed to pulse pulse driver circuit 28 which drives the up-down counter 29. The pulse driver also will act as a gate to stop the counter while reading is taking place, such being necessary because the counter is of the "ripple" type. The number in the counter will change in a serial manner as it counts. Inasmuch as there is a delay in each succeeding stage, the counter must come to rest before the number is read.

The up-down counter 29 functions as an integrator, the number in the counter being an integral of the pulse rate.

The inputs to the counter include pulses from the pulse driver 28, the up or down gating levels from 22, 23, and a reset level from the computer returning the counter to zero.

Counter 29 can be made up of four medium-scale integrated circuits of the metal oxide semiconductor logic type. Each of the three circuits is a 4 bit up-down counter. As an example, these circuits can be of thick film field effect transistors, such as those made by General Instruments Company. The up-down counter outputs are voltage levels on 12 lines which are fed into DTL integrated circuit drivers.

Figure 5:
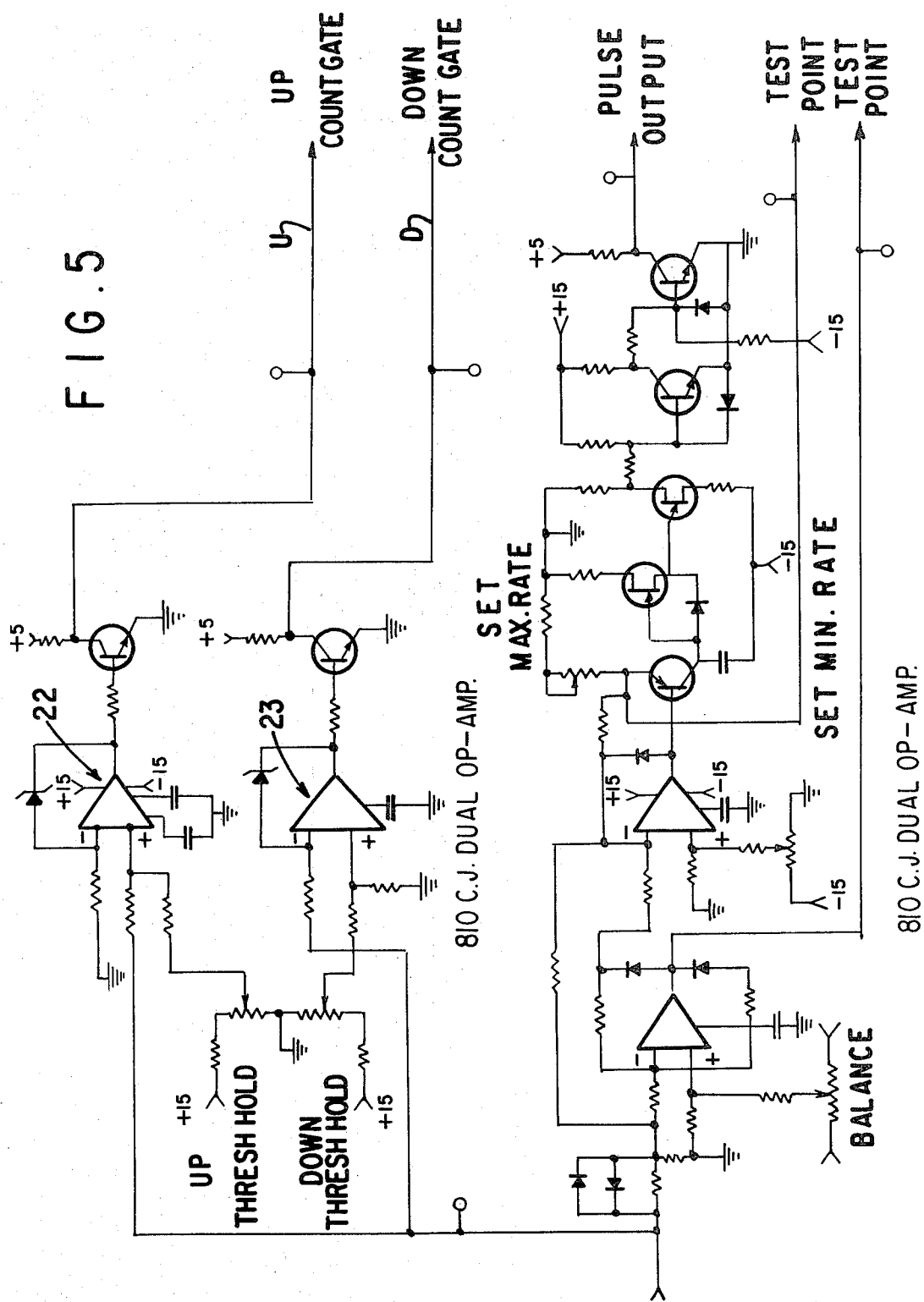
FIG. 5 is a wiring diagram that may be used.

FIG. 5 shows one circuit which could be used, details of the circuit not requiring description. Reference numerals thereon correspond to those of FIG. 4.

It is to be understood that the display could be a cross hair on a digital plotting board or on a computer operated drafting machine. The display could also be the horizon viewed by the pilot of an aircraft. The force operated control could be a single direction or a three direction device.

It should be apparent that variation may be made in the details without departing from the spirit of the invention except as set forth in the appended claims.

What is claimed is:

1. In a digital cursor positioner, the combination including an X-Y force responsive analog signal generator movable by an operator, pulse generating means receiving signals from said X-Y signal generator and producing pulses having a pulse rate which is infinitely variable non-linear between the maximum and minimum rates available from the pulse generator, the rate being a continuous function of the magnitude and polarity of said signal, an up-down counter connected to said pulse generator and producing a location indicating signal, and means receiving said location indicating signal and producing an indication of the location to be indicated to said operator.

2. A positioner as in claim 1 wherein there is a quickening circuit connected between the signal generator and the variable rate pulse generator.

3. An apparatus for digitally positioning a cursor on a cathode ray tube by manual control comprising means for generating X axis and Y axis analog signals responsive to the manual control; non-linear amplifying means for amplifying said X axis and Y axis signals, having a continuous, multiple slope amplifying characteristic; circuit means for quickened response to said non-linearly amplified X axis and Y axis signals; means for generating a first and second series of pulses, said first and second series of pulses being generated at a rate responsive to the magnitude and polarity of the quickened, non-linearly amplified X axis and Y axis signals, respectively; up-down counter means for determining the pulse rate of said first and second series of pulses; and means for applying the pulse rate of said first and second series of pulses to the X axis and Y axis of the cathode ray tube to position the cursor.

4. The apparatus as claimed in claim 3 wherein said circuit means has an input and an output terminal and a resistor in parallel with a capacitor is connected between said input and output terminals.

* * * * *